(12) United States Patent
Bai et al.

(10) Patent No.: US 8,288,305 B2
(45) Date of Patent: *Oct. 16, 2012

(54) SELECTIVE CATALYSTS FOR NAPHTHA HYDRODESULFURIZATION

(75) Inventors: Chuansheng Bai, Phillipsburg, NJ (US); Stuart Soled, Pittstown, NJ (US); Sabato Mlseo, Pittstown, NJ (US); Jonathan McConnachie, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 657 days.

This patent is subject to a terminal disclaimer.

(21) Appl. No.: 12/087,980

(22) PCT Filed: Jan. 12, 2007

(86) PCT No.: PCT/US2007/001001
§ 371 (c)(1), (2), (4) Date: Oct. 10, 2008

(87) PCT Pub. No.: WO2007/084438
PCT Pub. Date: Jul. 26, 2007

(65) Prior Publication Data
US 2010/0012554 A1    Jan. 21, 2010

(51) Int. Cl.
*B01J 31/02*    (2006.01)
*B01J 31/04*    (2006.01)
*B01J 21/08*    (2006.01)
*C10G 45/08*    (2006.01)

(52) U.S. Cl. ........ 502/150; 502/167; 502/172; 502/255; 502/260; 208/216 R; 208/217

(58) Field of Classification Search ........... 208/209, 208/213, 216 R, 216 PP, 217, 243, 244, 245; 502/150, 151, 158, 167, 172, 240, 254, 255, 502/258, 260
See application file for complete search history.

(56) References Cited

U.S. PATENT DOCUMENTS

| | | | |
|---|---|---|---|
| 4,132,632 | A | 1/1979 | Yu et al. |
| 5,985,136 | A | 11/1999 | Brignac et al. |
| 6,013,598 | A | 1/2000 | Lapinski et al. |
| 6,602,405 | B2 | 8/2003 | Pradhan et al. |
| 2002/0010086 | A1 | 1/2002 | Plantenga et al. |
| 2003/0173256 | A1 | 9/2003 | Fujikawa et al. |
| 2005/0139520 | A1 | 6/2005 | Bhan et al. |
| 2006/0000751 | A1 | 1/2006 | Bouchy et al. |
| 2007/0082811 | A1* | 4/2007 | Soled et al. ........... 502/302 |

FOREIGN PATENT DOCUMENTS

| | | | |
|---|---|---|---|
| EP | 0 067 459 A1 | 12/1982 | |
| EP | 0 181 035 A2 | 5/1986 | |
| EP | 181 035 | * 5/1986 | |
| GB | 950 952 | 3/1964 | |
| GB | 2 189 163 A | 10/1987 | |

OTHER PUBLICATIONS

Cattaneo, Riccardo; Shido, Takafumi; Prins, Roel, The Relationship between the Structure of NiMo/SiO2 Catalyst Precursors Prepared in the Presence of Chelating Ligands and the Hydrodesulfurization Activity of the Final Sulfided Catalysts, Journal of Catalysis 185, pp. 199-212 (1999).

Hiroshima, Kazutaka, Mochizuki, Takeo, Honma, Takehide, Shimizu, Takehiro, Yamada, Muneyoshi, "High HDS activity of Co-Mo/Al2O3 modified by some chelates and their surface fine structures", Applied Surface Science 121/122 (1997), pp. 433-436.

de Jong, Arthur M., de Beer, V.H.J. (San), van Veen, J.A. Rob, Niemantsverdriet, J.W. (Hans), "Surface Science Model of a Working Cobalt-Promoted Molybdenum Sulfide Hydrodesulfurization Catalyst: Characterization and Reactivity", Journal of Physical Chemistry 1996, 100, 17722-17724.

* cited by examiner

*Primary Examiner* — Walter D Griffin
*Assistant Examiner* — Renee E Robinson
(74) *Attorney, Agent, or Firm* — Bruce M. Bordelou

(57) ABSTRACT

Naphtha is selectively hydrodesulfurized with retention of olefin content. More particularly, a CoMo metal hydrogenation component is loaded on a silica or modified silica support in the presence of an organic additive to produce a catalyst which is then used for hydrodesulfurizing naphtha while retaining olefins.

20 Claims, 4 Drawing Sheets

SELECTIVE CATALYSTS FOR NAPHTHA HYDRODESULFURIZATION

FIELD OF THE INVENTION

This invention relates to a method for hydrodesulfurizing naphtha. More particularly, a Co/Mo metal hydrogenation component is loaded on a silica or modified silica support in the presence of an organic additive and then sulfided to produce a catalyst which is used for hydrodesulfurizing naphtha.

BACKGROUND OF THE INVENTION

Environmental regulations mandate the lowering of sulfur levels in motor gasoline (mogas). For example, it is expected that regulations will require mogas sulfur levels of 30 ppm or less by 2006. In many cases, these sulfur levels will be achieved by hydrotreating naphtha produced from Fluid Catalytic Cracking (FCC cat naphtha), which is the largest contributor to sulfur in the mogas pool. Since sulfur in mogas can also lead to decreased performance of catalytic converters, a 30 ppm sulfur target is desirable even in cases where regulations would permit a higher level. As a result, techniques are required that reduce the sulfur in cat naphthas while at the same time minimizing the reduction of beneficial properties such as octane number.

Conventional fixed bed hydrotreating can reduce the sulfur level of cracked naphthas to very low levels. However, such hydrotreating also results in significant octane number loss due to extensive reduction of the olefin content in the naphtha as well as excessive consumption of hydrogen during the hydrotreating process. Selective hydrotreating processes have recently been developed to avoid such olefin saturation and octane number loss. Unfortunately, the $H_2S$ liberated in the process reacts with retained olefins forming mercaptan sulfur by reversion. Such processes can be conducted at severities which produce product within sulfur regulations. However, significant octane number loss also occurs.

One proposed approach for preserving octane number during sulfur removal is to modify the olefin content of the feed using an olefin-modification catalyst followed by contact with a hydrodesulfurization (HDS) catalyst (U.S. Pat. No. 6,602,405). The olefin modification catalyst oligomerizes the olefins.

One recently developed method of HDS is SCANfining, which is a process developed by Exxon Mobil Corporation. SCANfining is described in National Petroleum Refiners Association paper # AM-99-31 titled "Selective Cat Naphtha Hydrofining with Minimal Octane Loss" and U.S. Pat. Nos. 5,985,136 and 6,013,598. Generally, SCANfining is a process that includes one and two-stage processes for hydrodesulfurizing a naphtha feedstock, where the feedstock is contacted with a hydrodesulfurization catalyst comprised of about 1 wt. % to about 10 wt. % $MoO_3$; and about 0.1 wt. % to about 5 wt. % CoO; and a Co/Mo atomic ratio of about 0.1 to about 1.0; and a median pore diameter of about 60 Å to about 200 Å.

Even though SCANfining controls the degree of olefin saturation while achieving a high degree of desulfurization, there is still a need to improve the selectivity of the catalyst system to further reduce the degree of olefin saturation thereby further minimizing octane number loss.

SUMMARY OF THE INVENTION

This invention relates to a method for making a catalyst and a method for the hydrodesulfurization (HDS) of naphtha. One embodiment relates to a method for making a catalyst suitable for the HDS of naphtha comprising: (i) impregnating a silica support that has a silica content of at least about 85 wt. %, based on silica with an aqueous solution of (a) a cobalt salt, (b) a molybdenum salt, and (c) at least one organic additive to form a catalyst precursor; (ii) drying the catalyst precursor at temperatures less than about 200° C. to form a dried catalyst precursor; and (iii) sulfiding the dried catalyst precursor to form the catalyst, provided that the dried catalyst precursor or catalyst is not calcined prior to sulfiding or use for HDS.

Another embodiment relates to a method for the HDS of naphtha having an olefin content of at least about 5 wt. %, based on naphtha comprising: (i) contacting the naphtha with a selective HDS catalyst under hydrodesulfurization conditions, wherein the selective HDS catalyst is prepared by impregnating a silica support that has a silica content of at least about 85 wt. %, based on silica with an aqueous solution of (a) a cobalt salt, (b) a molybdenum salt, and (c) at least one organic additive to form a catalyst precursor; (ii) drying the catalyst precursor at temperatures less than about 200° C. to form a dried catalyst precursor; and (iii) sulfiding the dried catalyst precursor to form the catalyst, provided that the dried catalyst precursor or catalyst is not calcined prior to sulfiding or use for HDS.

The silica supported catalyst when used for the HDS of a naphtha shows improved selectivity towards olefin saturation while maintaining a high level of HDS of the naphtha feed.

DETAILED DESCRIPTION OF THE INVENTION

Figure 1:
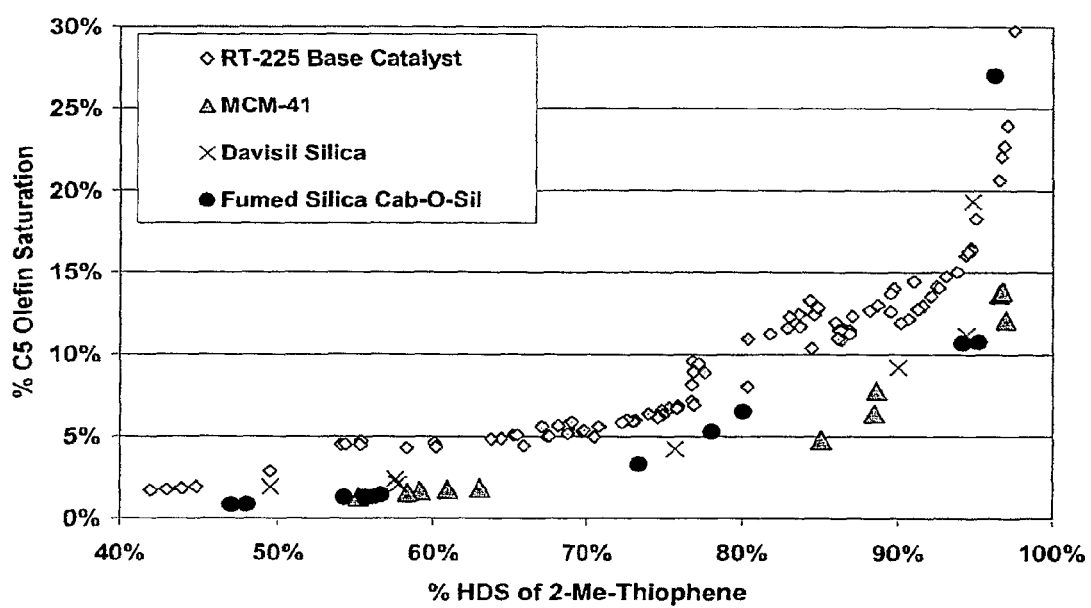
FIG. 1 is a graph showing the HDS performance of CoMo/silica catalysts with NTA as organic additive.

The term "naphtha" refers to the middle boiling range hydrocarbon fraction or fractions that are major components of gasoline, while the term "FCC naphtha" refers to a preferred naphtha that has been produced by the well known process of fluid catalytic cracking. Naphthas having a middle boiling range are those have boiling points from about 10° C. (i.e., from about $C_5$) to about 232° C. at atmospheric pressure, preferably from about 21° C. to about 221° C. Naphtha produced in an FCC process without added hydrogen contains a relatively high concentration of olefins and aromatics. Other naphthas such as steam cracked naphtha and coker naphtha may also contain relatively high concentrations of olefins. Typical olefinic naphthas have olefin contents from about 5 wt. % to about 60 wt. %, based on the weight of the naphtha, preferably 5 wt. % to about 40 wt. %; sulfur contents from about 300 ppmw to about 7000 ppmw, based on the weight of the naphtha; and nitrogen contents from about 5 ppmw to about 500 ppmw, based on the weight of the naphtha. Olefins include open chain olefins, cyclic olefins, dienes and cyclic hydrocarbons with olefinic side chains. Because olefins and aromatics are high octane number components, olefinic naphtha generally exhibits higher research and motor octane values than does hydrocracked naphtha. While olefinic naphthas are typically high in olefin content, they may also contain other compounds, especially sulfur-containing and nitrogen-containing compounds.

Selective Catalyst

In one embodiment, the catalyst for the selective removal of sulfur with minimal olefin saturation from an olefinic naphtha is a silica supported catalyst that has been impregnated with (a) a cobalt salt, (b) a molybdenum salt and (c) at least one organic additive, such as organic ligands. The silica support contains at least about 85 wt. % silica, based on silica support, preferably at least about 90 wt. % silica, especially at least about 95 wt. % silica. Examples of silica supports include silica, MCM-41, silica-bonded MCM-41, fumed silica, metal oxide modified siliceous supports and diatomaceous earth.

The cobalt and molybdenum salts used to impregnate the silica support may be any water-soluble salt. Preferred salts include carbonates, nitrates, heptamolybdate and the like. The amount of salt is such that the silica support will contain from about 2 wt. % to about 8 wt. % cobalt oxide, based on the weight of the catalyst, preferably from about 3 wt. % to about 6 wt. %, and from about 8 wt. % to about 30 wt. % molybdenum oxide, preferably about 10 wt. % to 25 about 25 wt. %, based on the weight of the support.

The silica support may also be doped with metals from Groups 2-4 of the Periodic Table based on the IUPAC format having Groups 1-18, preferably from Groups 2 and 4. Examples of such metals include Zr, Mg, Ti. See, e.g., The Merck Index, Twelfth Edition, Merck & Co., Inc., 1996.

Organic ligands are organic additives that are hypothesized to aid in distributing the Co and Mo components on the silica support. The organic ligands contain oxygen and/or nitrogen atoms and include mono-dentate, bi-dentate and poly-dentate ligands. The organic ligands may also be chelating agents. Organic ligands include at least one of carboxylic acids, polyols, amino acids, amines, amino alcohols, ketones, esters and the like. Examples of organic ligands include phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, and nitrilotriacetic acid (NTA), citric acid and urea.

While not wishing to be bound to any particular theory, it is postulated that the organic ligands such as arginine, citric acid and urea form complexes with at least one of Co and Mo. These Co- and/or Mo-organic ligand complexes interact with the silica surface to disperse the metals more evenly across the silica surface. This may lead to improved selectivity toward olefin saturation while maintaining the HDS activity for desulfurizing the naphtha feed.

Catalyst Preparation and Use

Silica supports were impregnated with aqueous solutions of Co and Mo salts using conventional techniques. The organic ligand may be added to the aqueous solution of salts prior to contact with the silica support. One embodiment for impregnating the silica support with metal salt is by the incipient wetness method. Incipient wetness is a conventional method, i.e., one known to those skilled in the art of hydroprocessing catalyst preparation, manufacture, and use. In this method, an aqueous solution containing metal salts and organic additive is mixed with the support up to the point of incipient wetness using conventional techniques.

The manner of impregnation of the silica support by metal salt may be by impregnating the silica support with a mixture of a cobalt salt and organic ligand using incipient wetness, drying the impregnated support and then impregnating the dried support with a molybdenum salt solution or molybdenum salt solution contain organic ligand up to the point of incipient wetness. In another embodiment, the order of impregnation by cobalt salt followed by molybdenum salt may be reversed. In yet another embodiment, the support may be co-impregnated with a mixture of cobalt salt and molybdenum salt plus organic ligand to incipient wetness. The co-impregnated support may be dried and the co-impregnation process repeated. In yet another embodiment, an extruded silica support may be impregnated with a mixture of cobalt salt, molybdenum salt and organic ligand and the impregnated support dried. This treatment may be repeated if desired. In all the above embodiments, the organic ligand may be a single ligand or may be a mixture of ligands. The impregnated silica support isolated from the reaction mixture is heated and dried at temperatures in the range from about 50° C. to about 200° C. to form a catalyst precursor. The drying may be under vacuum, or in air, or inert gas such as nitrogen.

The dried catalyst precursor is treated with hydrogen sulfide at concentrations of from about 0.1 vol. % to about 10 vol. % based on total volume of gases present, for a period of time and at a temperature sufficient to convert metal oxide, metal salt or metal complex to the corresponding sulfide in order to form the HDS catalyst. The hydrogen sulfide may be generated by a sulfiding agent incorporated in or on the catalyst precursor. In an embodiment, the sulfiding agent is combined with a diluent. For example, dimethyl disulfide can be combined with a naphtha diluent. Lesser amounts of hydrogen sulfide may be used but this may extend the time required for activation. An inert carrier may be present and activation may take place in either the liquid or gas phase. Examples of inert carriers include nitrogen and light hydrocarbons such as methane. When present, the inert gases are included as part of the total gas volume. Temperatures are in the range from about 150° C. to about 700° C., preferably about 160° C. to about 343° C. The temperature may be held constant or may be ramped up by starting at a lower temperature and increasing the temperature during activation. Total pressure is in the range up to about 5000 psig (34576 kPa), preferably about 0 psig to about 5000 psig (101 to 34576 kPa), more preferably about 50 psig to about 2500 psig (446 to 17338 kPa). If a liquid carrier is present, the liquid hourly space velocity (LHSV) is from about 0.1 $hr^{-1}$ to about 12 $hr^{-1}$, preferably about 0.1 $hr^{-1}$ to about 5 $hr^{-1}$. The LHSV pertains to continuous mode. However, activation may also be done in batch mode. Total gas rates may be from about 89 $m^3/m^3$ to about 890 $m^3/m^3$ (500 to 5000 scf/B).

Catalyst sulfiding may occur either in-situ or ex-situ. Sulfiding may occur by contacting the catalyst with a sulfiding agent, and can take place with either a liquid or gas phase sulfiding agent. Alternatively, the catalyst may be presulfurized such that $H_2S$ may be generated during sulfiding. In a liquid phase sulfiding agent, the catalyst to be sulfided is contacted with a carrier liquid containing sulfiding agent. The sulfiding agent may be added to the carrier liquid or the carrier liquid itself may be sulfiding agent. The carrier liquid is preferably a virgin hydrocarbon stream and may be the feedstock to be contacted with the hydroprocessing catalyst but may be any hydrocarbon stream such as a distillate derived from mineral (petroleum) or synthetic sources. If a sulfiding agent is added to the carrier liquid, the sulfiding agent itself may be a gas or liquid capable of generating hydrogen sulfide under activation conditions. Examples include hydrogen sulfide, carbonyl sulfide, carbon disulfide, sulfides such as dimethyl sulfide, disulfides such as dimethyl disulfide, and polysulfides such as di-t-nonylpolysulfide. The sulfides present in certain feeds, e.g., petroleum feeds, may act as sulfiding agent and include a wide variety of sulfur-containing species capable of generating hydrogen sulfide, including aliphatic, aromatic and heterocyclic compounds.

The dried catalyst is not calcined prior to either sulfiding or use for HDS. Not calcining means that the dried catalyst is not heated to temperatures above about 300° C., preferably about 200° C. By not calcining the catalyst, from about 60 wt. % to about 100 wt. % of the dispersing aid remains on the catalyst prior to sulfiding or use for HDS, based on the weight of the catalyst.

Following sulfiding, the catalyst may be contacted with naphtha under hydrodesulfurizing conditions. Hydrodesulfurizing conditions include temperatures of from about 150° C. to about 400° C., pressures of from about 445 kPa to about 13890 kPa (50 to 2000 psig), liquid hourly space velocities of from about 0.1 to 12, and $H_2$ treat gas rates of from about 89 $m^3/m^3$ to 890 about $m^3/m^3$ (500 to 5000 scf/B). After hydrodesulfurization, the desulfurized naphtha can be conducted away for storage or for further processing, such as stripping to remove hydrogen sulfide. The desulfurized naphtha is useful for blending with other naphtha boiling-range hydrocarbons to make mogas.

Embodiments, including preferred embodiments, are illustrated in the following examples.

EXAMPLE 1

Catalyst Preparation

The catalyst was prepared by an incipient wetness technique. Davisil silica, fumed silica Cab-O-Sil, MCM-41, $Y/SiO_2$, $Mg/SiO_2$, $Ti/SiO_2$ and $Zr/SiO_2$ were prepared as supports. The Co and Mo precursor compounds used in the preparation were cobalt carbonate hydrate and ammonium heptamolybdate tetrahydrate. The organic additive nitrilotriacetic acid (NTA) was used in the impregnation solution. The mole ratio of NTA to cobalt carbonate hydrate was 0.5.

The mixture solution containing NTA, Co and Mo was prepared as following: appropriate amounts of NTA and cobalt carbonate were added in distilled $H_2O$ and the mixture solution was stirred until the solution became clear. Then, appropriate amount of ammonium heptamolybdate tetrahydrate was added to make the final solution. After impregnation, the catalyst was dried at 160° F. under vacuum overnight (~14 hr). The catalysts contained 6% CoO and 24% $MoO_3$ metal loading. Besides NTA, organic additives of phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate and guanidine were also used in the catalyst preparation.

FIG. 1 is a graph showing the HDS performance of CoMo/silica catalysts with NTA as organic additive. From FIG. 1, it can be seen that the selectivity of CoMo supported on MCM-41 with NTA as organic additive without calcination has ~60% improvement vs. commercial catalyst (RT-225) manufactured by Albemarle at ~60% HDS level. At around 87% HDS conversion, the selectivity improvement of CoMo/MCM-41 is 48% over RT-225. At about 97% HDS conversion, the selectivity improvement above RT-225 is about 40%. CoMo sulfides supported on Davisil silica and fumed silica also showed 40-60% selectivity improvements over RT-225.

Table 1 shows a selectivity comparison of CoMo/Silica-NTA with and without calcination.

TABLE 1

| Support | Thermal Treatment Before Sulfiding | Selectivity vs. RT-225 |
| --- | --- | --- |
| Cab-O-Sil | High Temp Calcined | Same |
| Cab-O-Sil | 160 F. Vacuum Dried | 30-40% Better |
| Davisil Silica | High Temp Calcined | Same |
| Davis Silica | 160 F. Vacuum Dried | 40-60% Better |
| MCM-41 | High Temp Calcined | Same |
| MCM-41 | 160 F. Vacuum Dried | 40-60% Better |

Table 1 shows the impact of calcination on the selectivity of the catalysts. Upon calcination at high temperature prior to catalyst sulfidation, the selectivity of CoMo on siliceous supports decreased to the level of the reference catalyst RT-225. NTA forms stable complexes with Co and Mo. It is thought that the CoMo-NTA complex helps CoMo disperse on the silica support through the interaction of hydroxyl groups of silica and the hydrophilic function groups of NTA. High temperature calcination decomposes the complexes, therefore damaging the NTA dispersion function and resulting in a catalyst with low selectivity.

EXAMPLE 2

RT-225, a commercial Co/Mo HDS catalyst manufactured by Albemarle Corporation and the supported CoMo catalysts according to the invention with NTA as dispersing aid were sulfided using virgin naphtha and 3% $H_2S$. The respective catalysts were not calcined prior to use.

Feed for the catalyst evaluation was a $C_5$-350° F. naphtha feed containing 1408 ppmw S and 46.3 wt. % olefins, based on the weight of the naphtha. The conditions for HDS evaluation of catalysts from Example 1 were 274° C., 220 psig, liquid hourly space velocity of from about 1 to about 12, and $H_2$ treat gas rate of from about 89 to about 890 $m^3/M^3$ (500 to 5000 scf/B). The results of the HDS evaluation for the base case RT-225 catalyst, MCM-41 catalyst, Davisil silica catalyst and fumed silica Cab-O-Sil® are shown in FIG. 1, which is a graph showing a plot of % $C_5$ olefin saturation vs. % HDS of 2-methyl-thiophene.

EXAMPLE 3

Figure 2:
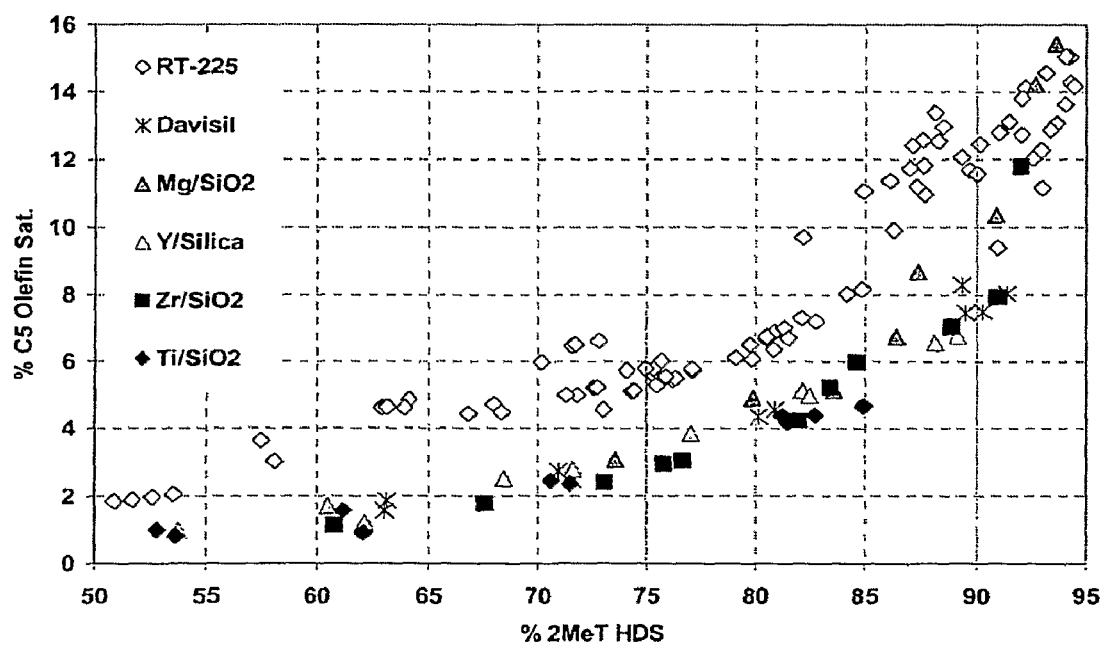
FIG. 2 is a graph showing a plot of % $C_5$ olefin saturation vs. % HDS of 2-methyl-thiophene.

The selectivity of Davisil silica and the modified silica supports of $Y/SiO_2$, $Mg/SiO_2$, $Ti/SiO_2$ and $Zr/SiO_2$, with NTA as organic ligand are demonstrated in this example using the preparative method of Example 1 and the HDS procedure of Example 2. FIG. 2 is a graph showing a plot of % $C_5$ olefin saturation on a weight basis vs. % HDS of 2-methyl-thiophene on a weight basis, based on the weight of the naphtha. As can be seen in FIG. 2, the catalysts showed substantial selectivity improvements over the RT-225 commercial catalyst, with 40 to 60% less olefin saturation between 60 and 90% HDS.

EXAMPLE 4

Figure 3:
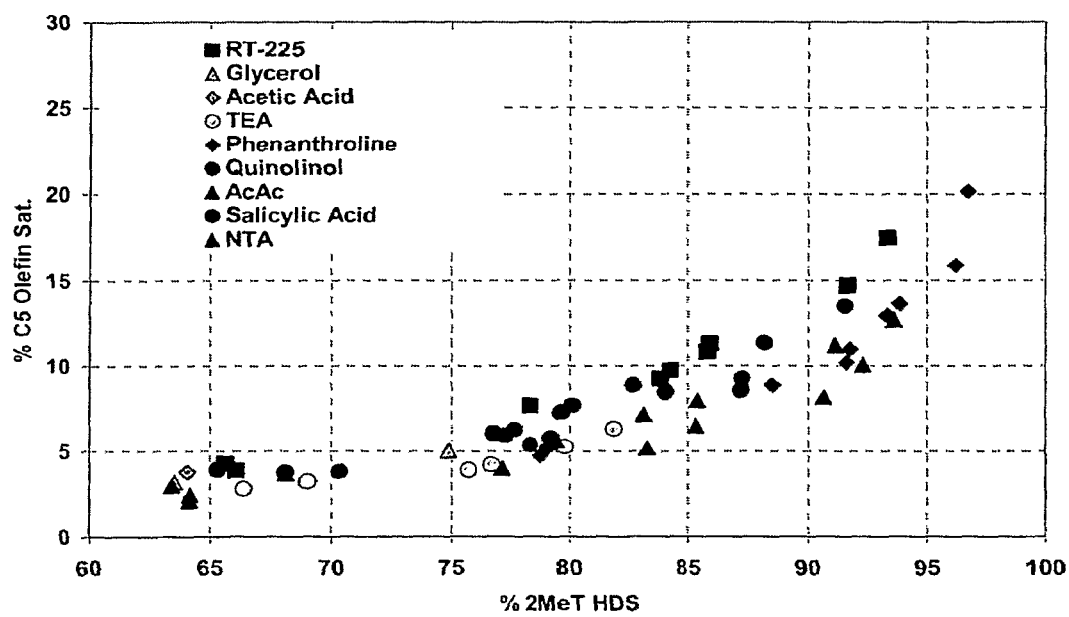
FIG. 3 is a graph showing % $C_5$ olefin saturation vs. % 2-methyl-thiophene HDS.

This example shows the effect of organic ligands (additives) on a CoMo on Davisil silica catalyst prepared according to Example 1 on HDS performance using the procedure of Example 2. The organic ligands are glycerol, acetic acid, TEA, phenanthroline, quinolinol, acetylacetonate, salicylic acid and NTA. FIG. 3 is a graph showing % $C_5$ olefin saturation vs. % 2-methyl-thiophene HDS, on a weight basis. As shown in FIG. 3, between 60 and 95% HDS conversions, all catalysts showed about 30 to about 60% selectivity improvements over the RT-225 commercial catalyst. Among the organic ligands used for catalyst preparations, the catalyst made with NTA showed better selectivity than other catalysts made with organic ligands, such as phenanthroline, quinolinol, salicylic acid, acetic acid, triethanolamine (TEA), glycerol and acetylacetonate. However, catalysts made with organic ligands showed better selectivity as compared to the base case, RT-225.

EXAMPLE 5

Figure 4:
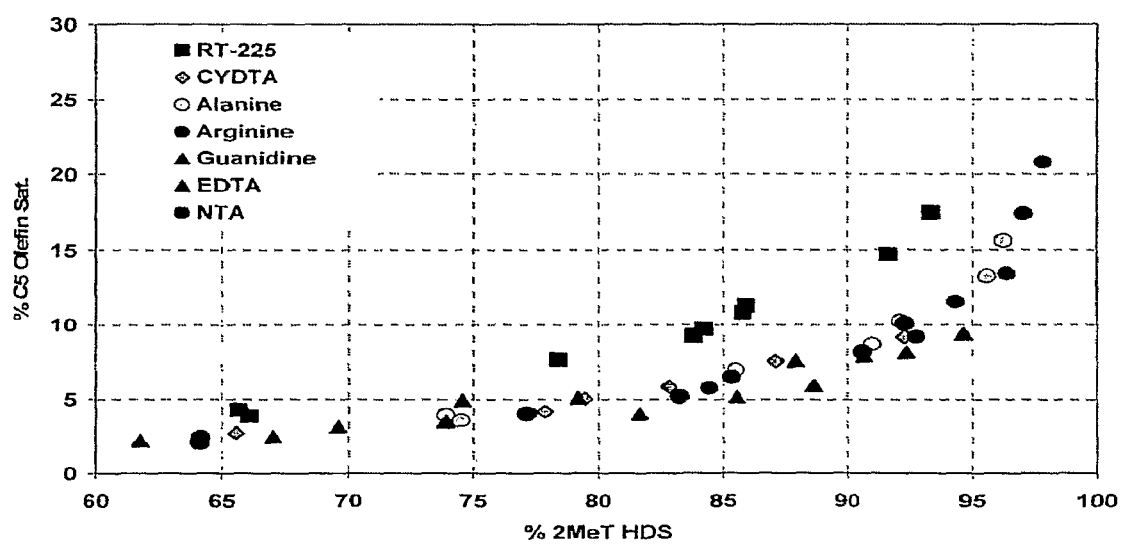
FIG. 4 is a graph showing % $C_5$ olefin saturation vs. % 2-methyl-thiophene HDS.

This example shows the effect of a different set of organic ligands on a CoMo on Davisil silica catalyst prepared according to Example 1 on HDS performance using the procedure of Example 2. The organic ligands are NTA, guanidine, ethylenediaminetetraacetic acid (EDTA), cyclohexanediaminetetraacetic acid (CYDTA), alanine and arginine and are compared to RT-225 as in Example 4 FIG. 4 is a graph showing % C5 olefin saturation vs. % 2-methyl-thiophene HDS, on a weight basis. As shown in FIG. 4, the catalysts made with NTA and guanidine exhibit better selectivity than the catalysts made with other organic ligands but catalysts made with organic ligands showed better selectivity as compared to RT-225.

The invention claimed is:

1. A method for making a catalyst suitable for the HDS of naphtha consisting essentially of:
   (i) impregnating a silica support that has a silica content of at least about 85 wt. %, based on silica, with an aqueous solution of (a) a cobalt salt, (b) a molybdenum salt, and (c) at least one organic additive to form a catalyst precursor;
   (ii) drying the catalyst precursor at temperatures less than about 200° C. to form a dried catalyst precursor; and
   (iii) sulfiding the dried catalyst precursor to form the catalyst, provided that the dried catalyst precursor or catalyst is not calcined prior to sulfiding or use for EMS.

2. A method for the EMS of naphtha having an olefin content of at least about 5 wt. %, based on naphtha comprising contacting the naphtha with a selective HDS catalyst under hydrodesulfurization conditions,
   wherein the selective HDS catalyst is prepared by the method consisting essentially of: (i) impregnating a silica support that has a silica content of at least about 85 wt. %, based on silica, with an aqueous solution of (a) a cobalt salt, (b) a molybdenum salt, and (c) at least one organic additive to form a catalyst precursor;
   (ii) drying the catalyst precursor at temperatures less than about 200° C. to form a dried catalyst precursor; and
   (iii) sulfiding the dried catalyst precursor to form the catalyst, provided that the dried catalyst precursor or catalyst is not calcined prior to sulfiding or use for HDS.

3. The method of claim 1 or 2 wherein the naphtha is at least one of FCC naphtha, steam cracked naphtha or coker naphtha.

4. The method of claim 1 or 2 wherein the naphtha has an olefin content from about 5 wt. % to about 60 wt. %, nitrogen content of from about 5 ppmw to about 500 ppmw and sulfur content from about 300 ppmw to about 7000 ppmw, based on naphtha.

5. The method of claims 1 or 2 wherein the silica support contains at least about 90 wt. % silica.

6. The method of claim 1 or 2 wherein the amounts of cobalt salt and molybdenum salt are sufficient to provide a catalyst support containing from about 2 wt. % to about 8 wt. % cobalt oxide and about 8 wt. % to about 30 wt. % molybdenum oxide, based on silica support.

7. The methods of claim 1 or 2 wherein the organic additive contains oxygen atoms, nitrogen atoms or both.

8. The methods of claim 1 or 2 wherein the organic additive is an organic ligand.

9. The method of claim 8 wherein the organic ligand is a mono-dentate, bi-dentate or poly-dentate ligand.

10. The method of claim 9 wherein the organic ligand is at least one carboxylic acid, polyol, amino acid, amine, amide, amino alcohol, ketone or ester.

11. The method of claim 10 wherein the organic ligand is at least one of phenanthroline, quinolinol, salicylic acid, acetic acid, ethylenediaminetetraacetic acid (EDTA), cyclohexanediaminetetraacetic acid (CYDTA), alanine, argin me, triethanolamine (TEA), glycerol, histidine, acetylacetonate, guanidine, nitrilotriacetic acid (NIA), citric acid or urea.

12. The method of claim 1 or 2 wherein the organic additive is a metal dispersion aid.

13. The method of claim 8 wherein the organic additive is a chelating agent.

14. The method of claim 1 or 2 wherein the catalyst precursor is dried at temperatures of from about 50° C. to about 200° C.

15. The method of claim 1 or 2 wherein sulfiding of catalyst precursor may be in-situ or ex-situ in the presence of at least one sulfiding agent.

16. The method of claim 15 wherein the sulfiding agent is hydrogen sulfide at concentrations of from about 0.1 vol. % to about 10 vol. %, based on total volume of gases present.

17. The method of claim 2 wherein hydrodesulfurizing conditions include temperatures of from about 150° C. to about 400° C., pressures of from about 445 kPa to about 13890 kPa (50 to 2000 psig), liquid hourly space velocities of from about 0.1 to about 12 and hydrogen treat gas rates of from about 89 m$^3$/m$^3$ to about 890 m$^3$/m$^3$ (500 to 5000 scf/B).

18. The method of claim 1 or 2 wherein the dried catalyst precursor or sulfided catalyst is not heated to temperatures greater than about 300° C. prior to sulfiding or use for HDS.

19. The method of claim 8 wherein the organic ligand is selected from the group consisting of glycerol, acetic acid, acetylacetone, and salicylic acid.

20. The method of claim 1 or 2 wherein the silica support is selected from the group consisting of Y/SiO$_2$, Mg/SiO$_2$, Ti/SiO$_2$, and Zr/SiO$_2$.

* * * * *